(12) United States Patent
Fretz

(10) Patent No.: US 10,687,157 B2
(45) Date of Patent: Jun. 16, 2020

(54) HEAD DIRECTION HEARING ASSIST SWITCHING

(71) Applicant: IntriCon Corporation, Arden Hills, MN (US)

(72) Inventor: Robert J. Fretz, Maplewood, MN (US)

(73) Assignee: IntriCon Corporation, Arden Hills, MN (US)

( * ) Notice: Subject to any disclaimer, the term of this patent is extended or adjusted under 35 U.S.C. 154(b) by 0 days.

(21) Appl. No.: 16/162,051

(22) Filed: Oct. 16, 2018

(65) Prior Publication Data

US 2019/0116434 A1 Apr. 18, 2019

Related U.S. Application Data

(60) Provisional application No. 62/572,756, filed on Oct. 16, 2017.

(51) Int. Cl.
*H04R 25/00* (2006.01)
*G06F 3/16* (2006.01)
*H04R 29/00* (2006.01)

(52) U.S. Cl.
CPC ........... *H04R 25/554* (2013.01); *G06F 3/165* (2013.01); *H04R 25/43* (2013.01); *H04R 25/505* (2013.01); *H04R 29/005* (2013.01); *H04R 25/552* (2013.01); *H04R 2225/41* (2013.01); *H04R 2225/43* (2013.01); *H04R 2225/55* (2013.01); *H04R 2460/07* (2013.01)

(58) Field of Classification Search
CPC ....... H04R 25/00; H04R 25/55; H04R 25/558
USPC ........................................ 381/312, 313, 315
See application file for complete search history.

(56) References Cited

U.S. PATENT DOCUMENTS 8,737,650 B2 * 5/2014 Pedersen .............. H04R 25/558
  381/312
9,729,994 B1   8/2017 Eddins et al.
9,736,604 B2   8/2017 Kim et al.
(Continued)

OTHER PUBLICATIONS

Gibson, Paul L, Project No. 1R43DC013004-01, "Head Tracking Hearing Aid for Automatic Source Switching," Print Out of webpage from https://projectreporter.nih.gov, printed out Sep. 27, 2018.

*Primary Examiner* — Suhan Ni
(74) *Attorney, Agent, or Firm* — Shewchuk IP Services, LLC; Jeffrey D. Shewchuk

(57) ABSTRACT

A body-worn hearing assist device such as a hearing aid allows at least two audio inputs, such as through a wireless chipset and from an onboard microphone. The hearing aid has a directional sensor, preferably a combination magnetic sensor/accelerometer, which allows the hearing aid to determine which direction the user is facing. A directional reference associated with a "remote" sound source, i.e., the direction the user would naturally face to best hear the wirelessly transmitted audio, is stored in memory. When the user faces in the direction of the "remote" sound source, such as watching a screen of an audio-visual program having a wireless audio streamer or looking at someone using a wireless microphone, the wirelessly received audio is coupled as the primary input of the hearing aid. When the user turns and faces a different direction, the hearing aid automatically switches the primary input source to the onboard microphone.

20 Claims, 4 Drawing Sheets

(56) References Cited

U.S. PATENT DOCUMENTS 9,992,585 B1 6/2018 Recker et al.
2015/0296310 A1* 10/2015 Chen ................ H04M 1/72591
381/315

* cited by examiner

HEAD DIRECTION HEARING ASSIST SWITCHING

CROSS-REFERENCE TO RELATED APPLICATION(S)

The present application claims the benefit of U.S. provisional patent application Ser. No. 62/572,756, filed Oct. 16, 2017, entitled "YOU SEE IT—YOU HEAR IT HEARING ENHANCEMENT". The contents of U.S. provisional patent application Ser. No. 62/572,756 are hereby incorporated by reference in entirety.

BACKGROUND OF THE INVENTION

The present invention is directed to head-worn hearing devices, such as head-worn hearing aids and personal sound amplifier products ("PSAPs"), and particularly to such head-worn mobile hearing devices which have both a microphone for receiving sound and a separate wireless receiver for receiving a wireless audio signal, either or both of which can be output on a speaker (referred to in the hearing aid industry as a "receiver") or as an electrical stimulus with a cochlear implant. For simplicity in describing the invention, the present application uses the term "hearing aid", but the invention applies equally to other types of head-worn hearing devices, both to address hearing deficiencies and for other purposes.

A common problem for hearing impaired people when using a hearing aid is understanding speech in noisy conditions. In technical terms, hearing impaired people would do better if the signal to noise (S/N) ratio of the audio content were improved. Consider a hearing impaired person at a noisy restaurant with his or her spouse and four other people. If stuck at the corner of the table, the hearing impaired person may have a major problem understanding the speaker(s) at the far end of the table. A directional hearing aid (hearing aid with a microphone array which can be controlled to amplify sounds from the selected direction more than sounds from other directions) helps, but the beam forming of today's directional hearing aids is broad (covers a relatively wide area) and not very effective in reverberant environments.

A separate problem occurs when the hearing aid can receive a wireless audio signal, such as from a TV streamer or from a remote microphone, and then amplify, shape and/or otherwise output the signal to be best heard and understood by the wearer of the hearing aid. When using such a wireless audio input, the user may not desire to only listen to the wireless audio signal, but may concurrently or sporadically want to listen to sound from a different source received through the hearing aid microphone. For example, the TV streaming user may want to converse with another person in the room during TV commercials. A similar condition would be on an airplane where a person (not necessarily hearing impaired) is using earbuds or headphones (possibly noise cancelling) to listen to a movie, but who may want to sporadically converse with the flight attendant or person seated in the next seat. The audio from the movie makes hearing speech, even from a nearby person, difficult.

With some hearing aids, the user may be able to switch back and forth between the wireless audio input and the hearing aid microphone input, using a control mechanism such as push buttons on the hearing aid, on the TV streamer, or from a cell phone application in communication with the hearing aid. Such user-controlled manual switching allows good performance for both inputs, but repeatedly initiating the manual switching each time the user wants to switch sound sources is tedious and can become a serious hassle. Another alternative is to have the hearing aid consistently mix the wireless audio input with the microphone input, allowing the user to continually hear both inputs. Mixing multiple audio inputs is hassle free, but reduces the S/N performance. Better solutions are needed.

BRIEF SUMMARY OF THE INVENTION

The present invention involves automatic switching of audio input source based on the direction the hearing assist device user is looking. The body-worn hearing assist device includes a housing which mates with the user's head anatomy, with a directional sensor which allows a determination of which direction the user is facing. The reading from the directional sensor is compared to a stored positional reference associated with one of the audio input sources. For instance, the stored positional reference may be the direction of a screen that the user may watch a video program on, with one of the audio input sources being the audio track of the audio-visual program, wirelessly transmitted to the hearing assist device. When the user faces the screen, the audio track is coupled to the output of the hearing assist device. When the user faces away from the screen, the output of the hearing assist device is primarily coupled to a separate input, such as from a microphone of the hearing assist device. Thus, the user can control which audio input is primarily heard, either by looking at the screen to listen to the audio track, or turning away from the screen to hear speech from someone else in the room.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
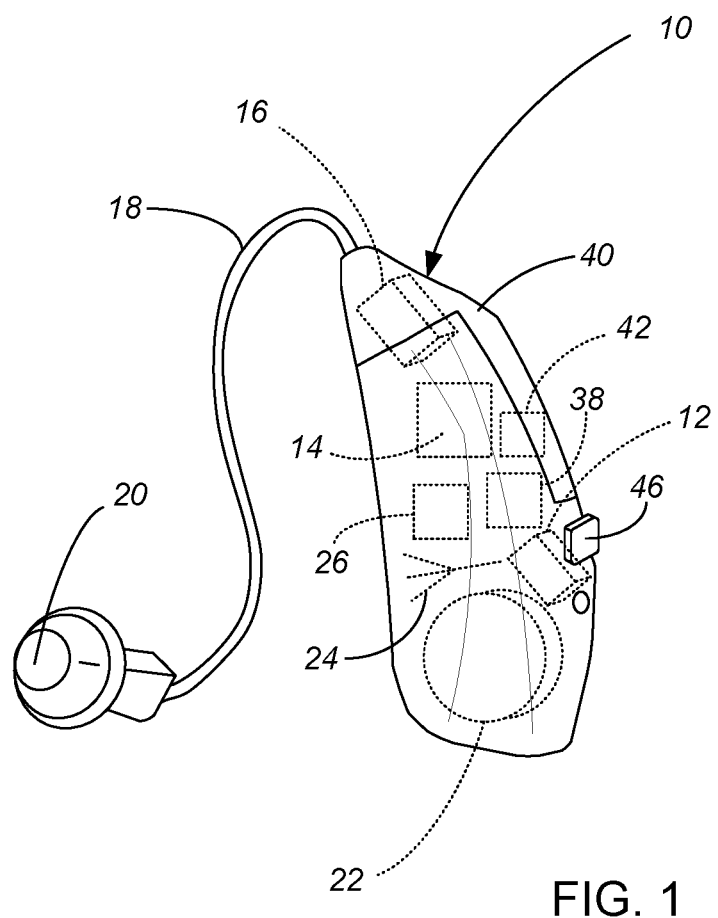
FIG. 1 is a side view of a behind the ear hearing aid incorporating the present invention, with the major internal components of the hearing aid shown in dashed lines.
Figure 3:
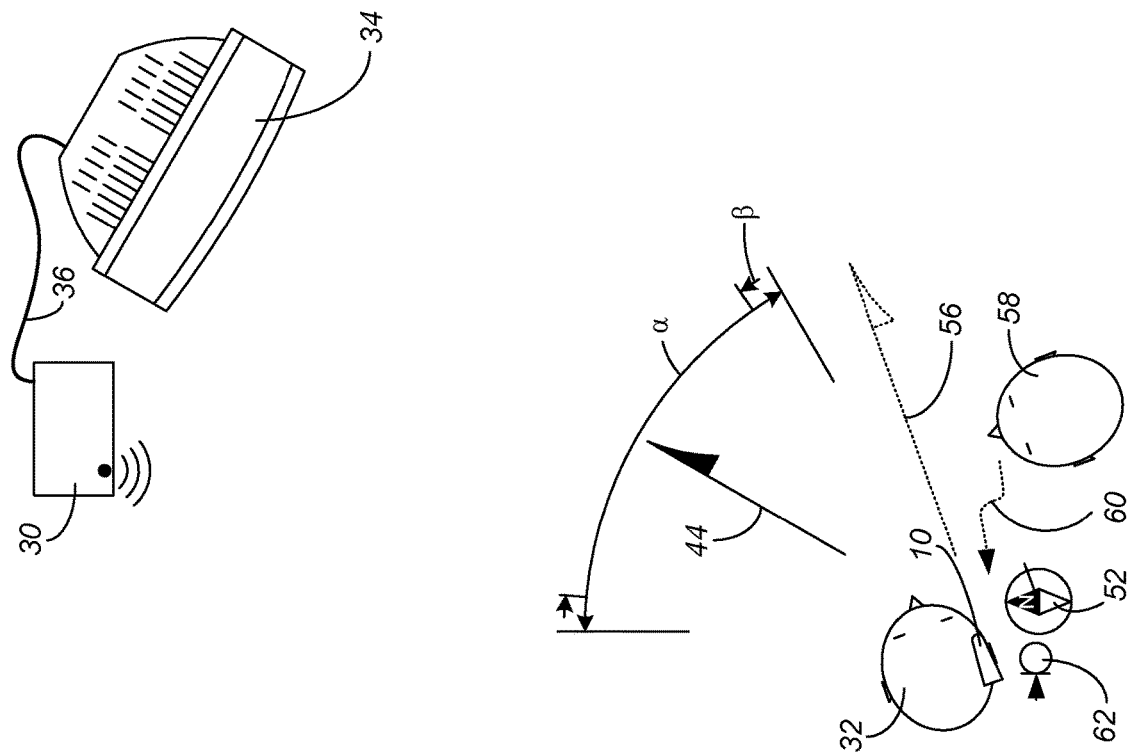
FIG. 3 is a schematic view of the room and system of FIG. 2, showing the user turning to converse with the companion and hear sound in the room through the onboard microphone of the hearing aid.
Figure 2:
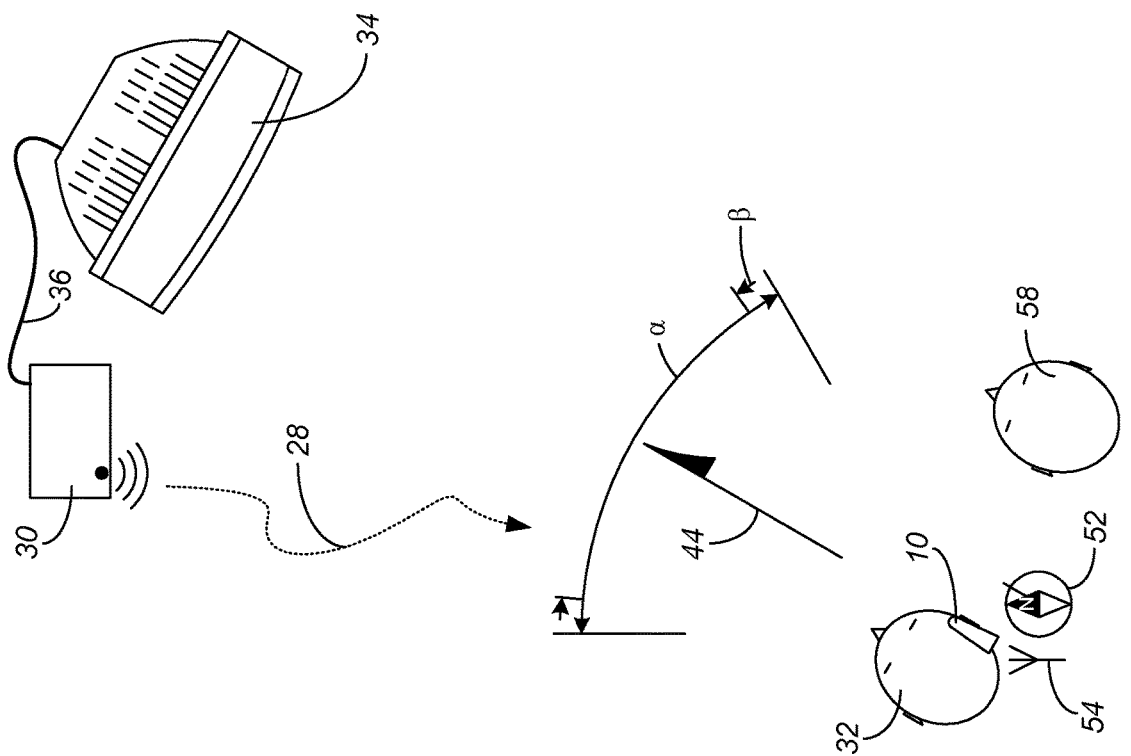
FIG. 2 is a schematic view of a room, with North facing upwards on the page, showing a user of the hearing aid of FIG. 1 watching television together with a companion while using the present invention to hear television audio through a wireless TV streamer.

FIGS. 1-3 show a first embodiment of the present invention as applied within a hearing aid 10. The hearing aid 10 depicted in FIG. 1 is a behind-the-ear ("BTE") type, but the invention is equally applicable with any type of hearing aid, including in-the-ear ("ITE"), receiver-in-canal ("RIC"), in-the-canal ("ITC") or completely-in-canal ("CIC"). As conventional, the hearing aid 10 includes a microphone 12 to receive airborn sound and convert the sound waves into an electrical signal. The hearing aid 10 includes some sort of amplification electronics 14 which increase and often modify the electrical signal to compensate for the hearing loss profile of the user, and a speaker 16 (commonly called a "receiver" in the hearing aid industry) for converting the amplified output back into sound waves that can be better heard by the user. In this example, a sound tube 18 extends an output 20 into the user's ear canal so the output sound is closer to the user's ear drum. The electronic circuitry is commonly powered by a replaceable or rechargeable battery 22. Like most modern hearing aids, an analog electrical output from the microphone 12 is converted into a digital representation, and the amplification electronics include a digital signal processor (DSP) 14 mounted on a circuit board within the housing 40, the DSP 14 acting on the digital representation of the signal.

The hearing aid 10 also includes an antenna 24 and chipset 26 preferably mounted on the same circuit board as the DSP 14, for receiving a wireless audio radio input 28 as an audio signal which can be input to the DSP 14 instead of or in addition to the audio signal from the microphone 12. The preferred radio 26 is a BLUETOOTH or BLUETOOTH Low Energy module such as a CSR8635 (from Qualcomm, San Diego, Calif.) BT chipset and/or a nRF52832 (from Nordic Semiconductor, Trondheim, Norway) base BLE chipset. Alternatively or additionally the radio chipset 26 could use a different wireless protocol, such as a proprietary radio, a Wi-Fi (IEEE 802.11) radio, a near-field communication radio, a ZIGBEE radio, or even a cellular network radio (all preferably FCC pre-certified), and the present invention is not tied to any particular type of wireless signal 28, as long as the wireless signal 28 includes the audio signal which can be coupled to the hearing aid output 20. Thus the hearing assist device for use with the present invention can receive at least one audio input which is distinct from sound in the room which could naturally be heard at the user's ears, in this example through the wireless antenna 24.

In this example as schematically shown in FIG. 2, the wireless audio signal 28 is sent from a television streamer 30 transmitting the audio track of a television program which the user 32 is watching. The TV streamer 30 can be positioned close to the television 34 and receive the audio signal through a microphone (not shown) on the streamer 30, in which case the microphone on the streamer 30 should be situated near the TV sound source so as to obtain a good, low noise audio signal. More preferably the TV streamer 30 receives the audio track directly through a wired connection 36 to the TV 34, regardless of whether the television audio is simultaneously audible within the room. The TV streamer 30 then transmits the TV audio signal 28 wirelessly to the user's hearing aid 10.

In accordance with the present invention, a head worn directional sensor 38 is included in the system, to determine the direction the user 32 is facing at any moment in time. In the preferred hearing aid 10 of FIG. 1, the directional sensor 38 is added onto the circuit board within the housing 40 of the hearing aid 10, with the hearing aid 10 worn on the user's ear so as to move whenever the user's head turns. The housing 40 of the hearing aid 10 mates with the user's ear anatomy, so when the north-south-east-west ("NSEW") direction that the wearer 32 is facing changes, the NSEW orientation of the hearing aid 10 correspondingly changes. In one embodiment, the directional sensor 38 is a 3-axis magnetic sensor with on-chip signal processing and integrated I2C bus such as the MMC3316xMT available from Memsic, Inc. This device and similar sensors detect the earth's magnetic field. Such directional sensors are common components of cell phones and other portable consumer electronic devices to function similarly to a compass. Commercially available directional sensors are small (about 2 mm×2 mm), use low power (about 100 mA at 1.8V) and are inexpensive. The preferred directional sensors have an accuracy of about 2°.

A magnetic sensor 38 alone can have difficulties in attempting to distinguish head rotation from head nodding or head tilt. The earth's magnetic field in North America has a horizontal component that faces North, as expected, but the earth's magnetic field is angled relative to horizontal in North America and has an even larger component that is vertical. Nodding (pitch) or tilting (roll) of the head can appear to the magnetic sensor 38 as a change of head direction (yaw) when there is no true directional head rotation. To help avoid these problems, a gravitational sensor 42 is preferably also added on the circuit board, which detects the direction of the earth's gravitation and so allows for calculating the true head rotation. The preferred gravitational sensor is an accelerometer 42 which detects the earth's gravitational acceleration, averaged out to mask shorter term movements. The Design tip DT0058 from STMicroelectronics, "Computing tilt measurement and tilt-compensated e-compass" describes one preferred set of correction calculations.

Both the magnetic sensor 38 and the accelerometer 42 should preferably be 3 axis detectors. This allows for resolving head nodding and tilting as mentioned above and also allows for versatile physical mounting options. An alternative directional sensor is LSM303DLHC available from STMicroelectronics, which incorporates both a 3D digital magnetic sensor and a 3D digital linear acceleration sensor.

The concept of the present invention is to perform automated switching between at least two incoming audio signals, one from the TV streamer 30 and the other from the hearing aid microphone 12, based on the direction the user 32 is facing at that given moment in time. Because people generally face in the same direction as they look with their eyes, the concept of the present invention can be referred to as "You See It, You Hear It".

An initial step in using the present invention is to determine and store in memory on the hearing aid 10 a remote source positional reference 44. This initial step can be achieved in any of several different ways. In one embodiment, the preferred ear pieces/hearing aids have a separate mode, labeled a "You-See-It-You-Hear-It" mode, which activates the directionality method. The "You-See-It-You-Hear-It" mode can be accessed such as through a switch 46 on the housing 40 of the hearing aid 10. In this embodiment, when the user 32 switches the hearing aid 10 to the You-See-It-You-Hear-It mode, a voice prompt is projected from the ear piece 20 to instruct the user 32 to look at the wireless sound source, in this case the TV 34, i.e., to look in the direction that the user 32 wants associated with the remote audio source. As shown in FIG. 2, the TV 34 is positioned NNE (at 30° on the directional sensor 38) of the hearing aid user 32. The algorithm processor then records that magnetic direction and remembers that as the direction of the remote audio source, graphically depicted in FIG. 2 with the arrow 44. This calibration process takes 1 or 2 seconds, and is retained until the user 32 deactivates or reactivates the You-See-It-You-Hear-It mode. Then the voice prompt tells the user 32 that the calibration is complete.

Figure 5:
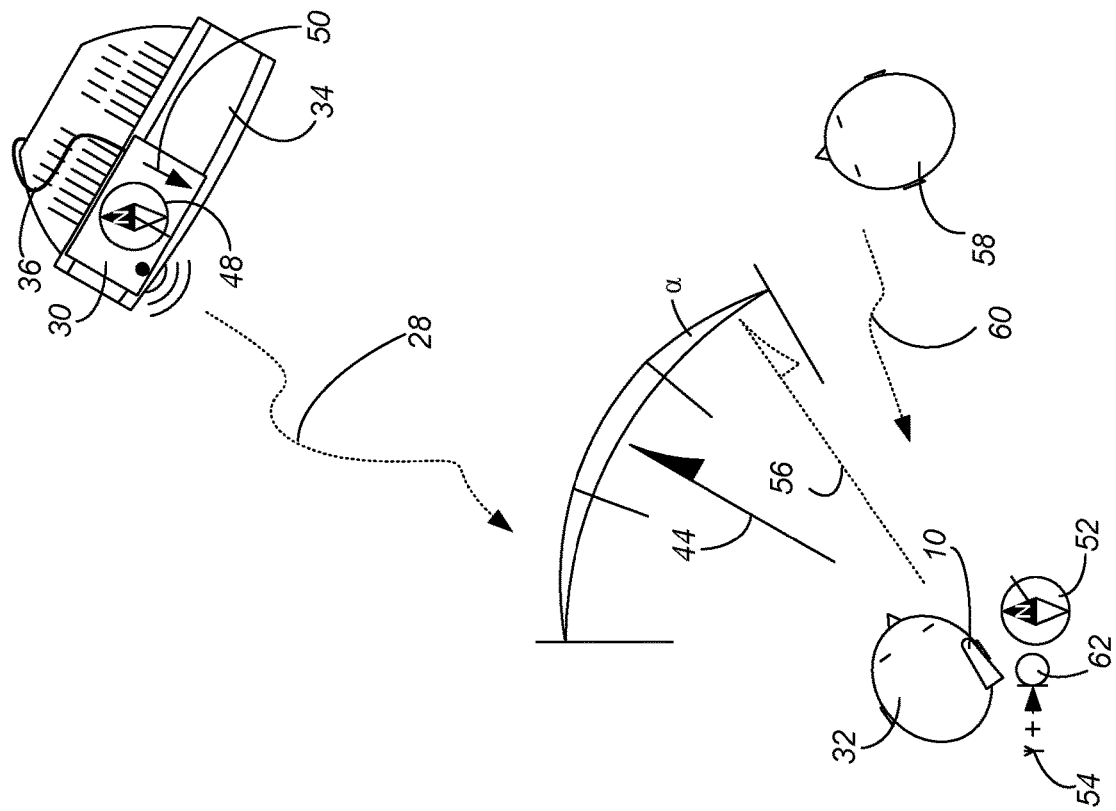
FIG. 5 is a schematic view of the room and system of FIG. 4, showing the user turning to converse with the companion and hear sound in the room largely through the onboard microphone of the hearing aid, while retaining a portion of the wireless TV streamer audio.
Figure 4:
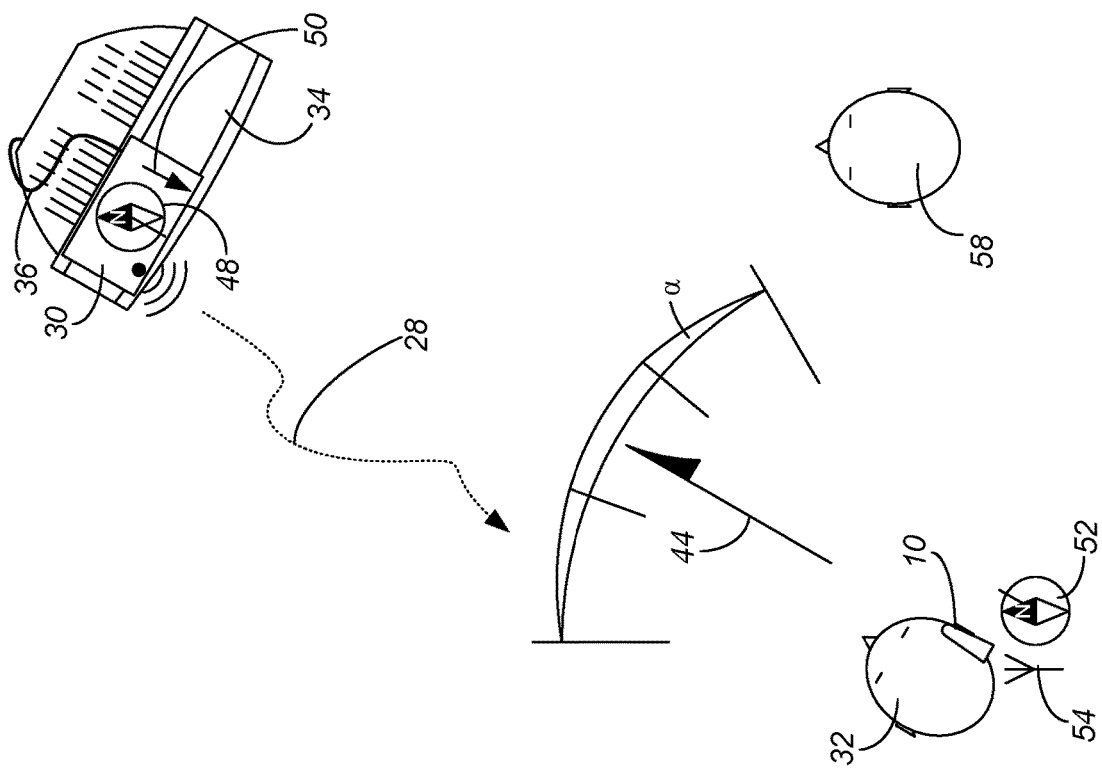
FIG. 4 is a schematic view of a room, with North facing upwards on the page, showing a user of the hearing aid of FIG. 1, watching television together with a companion while using the present invention to hear television audio through a different embodiment of wireless TV streamer which has its own directional sensor for the set up of the hearing aid algorithm.

In another embodiment depicted in FIGS. 4 and 5, the TV streamer 30 itself includes a magnetic sensor 48. With the TV streamer 30 having its own magnetic sensor 48, and the remote source positional reference 44 can be determined based on the orientation of the TV streamer 30 or of a component on the TV streamer 30. Correlation between the orientation of the TV streamer 30 and the direction from the user 32 to the remote source positional reference 44 can be as simple as an arrow 50 printed on the TV streamer 30, or alternatively on a knob (not shown) on the TV streamer 30. In setting up the TV streamer 30, the user 32 positions the TV streamer 30 above, in front of or under the TV 34 and points or "aims" the arrow 50 to the favorite chair that the user 32 will be sitting in while watching TV. If the user 32 doesn't want the TV streamer 30 permanently positioned in this location, the user 32 can thereafter move the TV streamer 30 anywhere in the room (such as back to the position of the TV streamer 30 in FIGS. 2 and 3), without changing the NSEW orientation of the arrow 50, or otherwise orient the arrow 50 so it points parallel and opposite to the direction the user 32 will face when watching TV. For instance, FIG. 4 shows the TV streamer 30 oriented so it faces SSW (210° on the directional sensor 48), facing the 180° opposite direction as the NNE direction the user 32 will be facing when watching TV. The SSW direction of this "aim", determined by the reading of the TV streamer's compass 48, is sent to the hearing aid 10, along with the audio signal 28 via the wireless link. Whether through a calibration step with the hearing aid 10 or by using a directional sensor 48 on the TV streamer 30, the hearing aid 10 stores the direction 44, in this example NNE, that the remote source positional reference is relative to the user 32.

The algorithm to perform the automated switching works by comparing the realtime compass direction of the hearing aid 10, as sensed by the directional sensor 38 with the reading indicated by the compass icon 52, with the stored compass direction 44 of the remote source positional reference. If the user 32 looks toward the direction of the remote source, the algorithm switches to that source as the primary input. That is, using the example of FIGS. 2 and 3, when the user 32 is facing and looking NNE as shown in FIG. 2, the hearing aid processor algorithm couples the wireless audio signal 28 to the hearing aid output 20, thereby providing a good, clear audio (high S/N) signal of the TV audio track. The fact that the hearing aid 10 is outputting the audio signal 28 wirelessly received through the hearing aid's radio 26 is schematically indicated by the antenna icon 54 next to the hearing aid 10.

If the user 32 looks away from the remote source, the new direction 56 that the user 32 is looking is identified by the directional sensor 38 in the hearing aid 10. Once the reading 52 of the directional sensor 38 no longer points to the stored remote source positional reference 44, the hearing aid 10 switches the audio input being used to the hearing aid microphone(s) 12. That is, using the example of FIGS. 2 and 3, when the user 32 faces away from NNE, such as when looking 56 almost East toward another person 58 in the room situated away from the TV 34, the hearing aid processor algorithm switches and couples the audio signal from the hearing aid microphone 12 to the hearing aid output 20, to give good amplification of local acoustic inputs such as speech 60 from the other person 58. The fact that the hearing aid 10 is outputting the audio signal received by the hearing aid's microphone 12 is schematically indicated in FIG. 3 by the microphone icon 62 next to the hearing aid 10. It is not important whether the magnetic sensor 38 of the hearing aid 10 is detecting a true NSEW direction, just that it is able to use a comparison between the realtime magnetic direction 52 and the stored magnetic direction 44 in an automated calculation to quickly switch between input sources as the user 32 turns his or her head.

The preferred algorithm does not require the user 32 to be looking exactly at the remote source positional reference 44, but rather allows a range of head angles α to couple the wireless audio signal to the hearing aid output. The switching algorithm is thus designed to have a directional window around the remote source positional reference 44, i.e., any compass reading of head direction plus or minus a number of degrees a of the calibrated stored direction 44 is registered and interpreted as looking at the remote sound source. For instance, the permissible head angle variance a can be anywhere from +/±5° to +/±45° from direct alignment between the compass reading 52 and the stored remote source direction 44. A preferred embodiment shown in FIGS. 2 and 3 switches away from the wireless audio signal 28 to the microphone audio signal 60 at +/−30° from the NNE remote source positional reference 44. This allows some head motion (anywhere from direct 0° North to 60° ENE) while watching the TV 34 to occur without switching away from the TV streamer audio 28. In FIG. 3, when the user 32 turns toward a companion 58 to face at a compass reading 52 of 70° (almost East) which is beyond the +/−30° from the NNE stored direction 44, the hearing aid output comes from the input of the onboard microphone 12. Another preferred embodiment allows the user 32, in a set-up mode, to select how far a the user 32 can turn his or her head away from direct compass alignment with the remote source positional reference 44 to switch away from the wireless audio signal 28 to the microphone audio signal 60.

The threshold of the angle of where the switch from wireless audio to hearing aid microphone audio should have some hysteresis β, to compensate for the accuracy of the directional sensor and the smoothness of head motion in various users, which thereby prevents fluttering of the switch if the user rotates head angle very near the switching direction from wireless audio to hearing aid microphone audio. For instance, when using a directional sensor which is accurate to within 2°, a hysteresis value β such as from 2 to 5° is appropriate to prevent fluttering of the switch. For example and as shown in FIGS. 2 and 3, when the switch going away from the TV streamer audio is +/−30° from direct compass alignment, the switch going back to the TV streamer audio might require the user 32 to face within +/−25° of the remote source positional reference 44.

Further, some preferred embodiments have a level of hysteresis β well in excess of the amount necessary to prevent fluttering of the switch, such as in excess of 5°. For instance, preferred embodiments have a hysteresis value β of more than 2.5 times the level of accuracy of the directional sensor, such as from 2.5 to 20 times the level of accuracy of the directional sensor or within the range from 5 to 40°. The purpose of this high degree of hysteresis β is not to prevent fluttering of the switch, but rather to change the switching direction as perceived by the user. With a high degree of hysteresis β, the range of angles which cause switching from hearing aid microphone audio to wireless audio can be more restrictive, such as to within 5° of direct compass alignment. In addition to a high degree of hysteresis β, switching from hearing aid microphone audio to wireless audio can involve a time delay (or a time ramp up) such as from 0.5 to 5 seconds. The user must then look directly at the TV screen, for an intentional period of time (i.e., more than just through turning the user's head past the TV), in order to switch the wireless audio on. Once the wireless audio is on, the user then has some flexibility in head position while retaining the wireless audio. Only by turning his or her head significantly (intentionally) away from the TV screen will the signal switch to the microphone input.

The term "switch" is used regarding which input audio source is coupled to the output 20, and the switch can be, but is not limited to, abruptly changing 100% wireless input to 100% hearing aid microphone input, and vice versa. Other mix options are also possible. For example, when facing the remote source positional reference 44, 80% of the wireless input 28 could be combined with 20% of the hearing aid microphone input 60, so that some environmental input is provided even while the TV sound is being emphasized. When facing away from the remote source positional reference 44, 20% of the wireless input 28 could be combined with 80% of the hearing aid microphone input 60, so that some TV sound is provided even while permitting conversations with others in the room at intelligible S/N ratios.

In other preferred embodiments, instead of having a complete, instantaneous switch from one input source to the other, the change is performed as an incremental or smooth transition from 100% one source to a combination of both sources and eventually 100% of the second source. In the setting of FIGS. 4 and 5, the wirelessly transmitted TV audio input 28 is gradually switched off and the input from the onboard microphone 12 is gradually switched on as the user 32 turns away from the TV 34. For instance, one algorithm uses 100% wireless input when facing +/−5° of the TV 34, and then decreases remote input/increases microphone input 2% for each degree that the user 32 turns away from the TV 34, until reaching 100% hearing aid microphone input when the user's head is more than 55° from facing the TV 34. FIGS. 4 and 5 schematically depict a similar embodiment, which uses 100% wireless input 28 when facing +/−10° of the NNE positional reference 44 of the TV 34, smoothly decreasing to 0% wireless input 28 when facing more than 30° away from the NNE positional reference 44 of the TV 34. Thus, in FIG. 4 with the user 32 facing at a compass reading 52 of 30° NNE, the hearing aid output comes 100% from the antenna-received audio. In FIG. 5, when the user 32 turns toward a companion 58 to face at a compass reading 52 of 55°, the hearing aid output comes 25% from the antenna-received audio and 75% from the onboard microphone 12. Because the switch is gradual, no hysteresis is needed. The user 32 can thus control how far to turn his or her head toward the companion and thereby decide how much of the background antenna-received TV audio 28 to listen to while conversing and primarily listening to the companion 58 through the onboard microphone 12.

The description above and FIGS. 2-5 show the user 32 with one hearing aid 10, but the invention works with binaural aids as well. There are at least two possible arrangements for binaural situations. One possibility is for each hearing aid 10 to have its own directional sensor 38 and function independently. Depending upon the user's ear direction and how well each hearing aid 10 is mated with the user's head anatomy, the two hearing aids 10 might not switch at identical head angles, but the slight difference would not be objectionable. Another possibility is when there is communication between the binaural hearing aids. In this case, only one directional detector 38 in one of the two hearing aids is needed, but the smart switching of the two hearing aids is linked so both hearing aids switch simultaneously from one incoming audio source to the other.

Figures 6, 7:
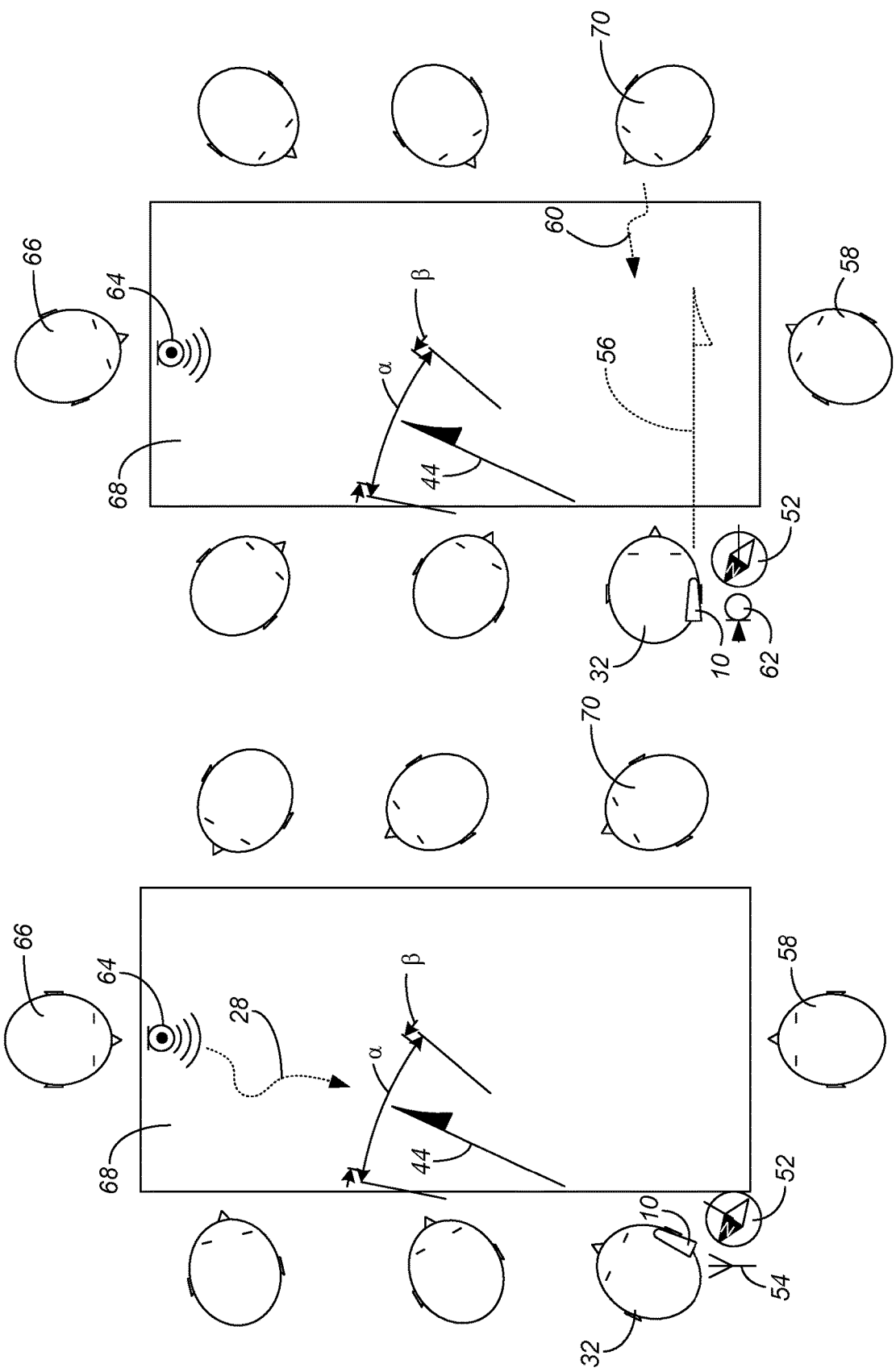
FIG. 6 is a schematic view of a large table, showing a user of the hearing aid of FIG. 1, listening to someone speaking into a microphone which wirelessly transmits its received audio to the hearing aid.
FIG. 7 is a schematic view of the table and system of FIG. 6, showing the user turning to listen to another person at the table, and hear sound in the room through the onboard microphone of the hearing aid.

FIGS. 6 and 7 show an embodiment of the invention similar to the embodiment of FIGS. 1-3, but with the algorithm switching threshold a set at +/−20° from direct alignment with the remote source positional reference 44, and with the hysteresis β set at 2°. In this example, the remote source positional reference 44 is lined up with a microphone 64 near the person 66 speaking at the head of the table 68. In this example, the table 68 is angled relative to North, sensed by the directional sensor 38 in the hearing aid 10 as shown by the compass icon 52. The microphone 64 could be a lavalier microphone worn by the person at the head of the table 68, or alternatively could be the microphone of a smart phone running an appropriate streaming software application and placed on the head of the table 68. For instance, before the discussion/presentation begins, the user 32 may start the streaming software application and position his or her smartphone in front of the primary presenter 66 at the head of the table 68, pointed at the seat where the user 32 will be sitting. The audio signal from the head-of-the-table microphone 64 is received in the hearing aid 10, which could be through a wired transmission to the hearing aid 10 but more preferably is via wireless transmission. The remote source positional reference 44 can be set up with either the voice prompt calibration process described above, or by having the smartphone application transmit its pointing direction from the smartphone's compass, or by other methods.

In FIG. 6, while the person 66 at the head of the table 68 is talking, the hearing aid user 32 is looking at the person 66 speaking and toward the head-of-the-table microphone 64 (which happens due to the room orientation to be East). In FIG. 7, a different person 70 at the foot of the table 68 makes a comment. The hearing aid user 32 naturally turns to the person 70 making the comment (turning to face SSE). Since the head turn exceeded the +/−20° threshold as sensed by the on board compass 52, the algorithm switches to the on board microphone input 60. When the user 32 later turns back to face within 18° of East, the algorithm will switch back to the antenna received audio source 28.

The present invention has application with other hearing assist devices outside of hearing impaired users. An example is a passenger on an airplane watching and listening to an audio-video screen (not shown) using a noise cancelling headset (not shown), which itself has a microphone (not shown) for use in the noise canceling algorithm. The headset can detect the direction the user is facing using the magnetic/accelerometer means described above. If the user is facing the screen, the audio from the program being watched is presented to the user. If the user turns away from the screen, then the headset input is switched to the microphone of the head set without noise cancelling. This allows the user to hear his or her companion when turning to look at the companion, or to hear a flight attendant when turning to look at the flight attendant.

While the preferred embodiments of the present invention utilize a combination of a magnetic detector 38 and accelerometer 42 to determine the compass direction 52 that the hearing assist device wearer 32 is facing, the invention encompasses other possibilities for the directional sensor. Examples of other possibilities include:

a) ultra sonic pulses could be generated by the remote microphone 64 or TV streamer 30. The user 32 would have two hearing aids that communicate with each other (by near field magnetic for example). The aids could tell when the user 32 is facing the source by the timing of the arrival of the sound bursts.

b) Infrared diodes (not shown) at the wireless source 30, 64 could be used. The earpiece/hearing aid would include infrared sensors (not shown) that are directional. Then the algorithm processor could detect when the user 32 is facing a particular wireless source.

c) Estimating the acoustic path length from source to left & right hearing aids. This technique is similar to (a) above but uses the audio signal. The audio signal from the hearing aid microphone 12 could be correlated with the wireless signal 28 to estimate the distance from the hearing aids to the remote source 30, 64. Then the path lengths of the left & right aids are compared. When the two path lengths are near equal, the wearer 32 is facing the source.

d) Camera face detection on wireless source. A camera (not shown) on the wireless source 30, 64 could use face detection to determine when the user is looking at the source 30, 64.

Combining an accelerometer 42 with other detection means (used for an initial orientation/calibration) would give both an accurate and fast acting method, responding more quickly to head movements than any of the above plans by themselves. Further, the short term accelerometer reading can be used to detect a user's head nod/shake, and a detected head nod/shake can be used to further control the hearing aid 10. For instance, the user's smart phone can be set up to convert text from certain sources to voice and stream them wirelessly to the user's hearing aid 10. The hearing aid 10, upon receiving incoming text, can advise the user 32 that a text has been received from a particular source, and ask the user 32 using voice prompts whether he/she wishes to hear the text. The user 32 then nods or shakes his or her head to indicate a desire to hear or not hear the input text. If the user 32 accepts the input, the text is read through the hearing aid acoustic output 20. This feature would be useful to a person who wants to receive an important text while in a meeting, theater or other venue where cell phones are supposed to be "off".

While the invention has been described for switching between a single antenna-received remote audio signal input and the onboard microphone signal input, the invention can also be used to switch between multiple remote audio signal inputs. For instance, in the environment shown in FIGS. 6 and 7, a second smart phone (not shown) may be placed on the table 68 to provide a second remote microphone input. Third, fourth, etc. smart phones may be added to the system on an ad hoc basis as appropriate. The smart phone microphone selected as the input for the hearing aid output is the microphone positioned closest to the direction the user 32 is facing, switching from one remote microphone to another as the user 32 turns his or her head.

In another embodiment, each of the smartphones has a directional microphone, amplifying sound better from one particular direction the microphone is facing. One smart phone is placed on the table 68 aimed in one direction. A second smart phone, such as of the wearer's spouse, separately lain on the table 68 facing another direction. Both are wirelessly connected to the hearing aid 10. When the user 32 faces the direction that the first smart phone microphone is directed, the first smart phone microphone is coupled for the output 20 of the hearing aid 10. When the user 32 faces the direction that the second smart phone microphone is directed, the second smart phone microphone is coupled for the output 20 of the hearing aid 10.

In another embodiment, the smart phones have steerable microphone arrays separated by a distance of several feet from the first remote microphone input. The invention works by the ear piece detecting the head direction of the hearing impaired person 32. This head direction can be used not only to switch between input sources in the hearing aid 10, but also can be transmitted wirelessly to both smart phones. In addition to switching between input sources, the smart phones aim each of their microphone arrays in the direction that the hearing impaired person 32 is looking. Since two microphone arrays of the cell phones are separated by several feet, they perform much better than the simple directional microphone of today's hearing aids and smart phones. Since the cell phones and ear piece all have NSEW directional reference, the microphone array direction can be synchronized with the head direction. Steerable microphone arrays can be mounted so as to be inconspicuous in the cell phone package.

The end result is a system that can be implemented with current technology and be discretely used. The present invention provides very big S/N ratio improvements, particularly in environments where multiple speakers may need to be heard, in which the user's changing of head direction quickly switches the sound input sources of the system.

Although the present invention has been described with reference to preferred embodiments, workers skilled in the art will recognize that changes may be made in form and detail without departing from the spirit and scope of the invention.

What is claimed is:

1. A body-worn hearing assist device worn by a user, comprising:

a microphone for converting airborne sound into a first audio input signal;

a wireless receiver for receiving at least a second audio input signal from a remote transmitter associated with a remote source position;

a housing which mates with the user's head anatomy, with a directional sensor within the housing;

memory for storing a positional reference to the remote source position;

a processor receiving realtime data from the directional sensor and using that realtime data to determine when a direction that the user is facing generally aligns with the stored remote source positional reference;

an output outputting audio to the user, the head-worn hearing assist device having an algorithm for switching the output from being primarily based on the first audio input signal when the user is facing generally away from the stored remote source positional reference to being primarily based on the second audio input signal when the user is facing generally toward the stored remote source positional reference.

2. The body-worn hearing assist device of claim 1, wherein the housing mates with the user's ear, and wherein the housing contains the microphone, the wireless receiver, the processor and the output, and wherein the output is a speaker converting an electrical signal into sound directed into the ear of the user.

3. The body-worn hearing assist device of claim 1, wherein the directional sensor comprises:
a magnetic sensor sensing compass direction based on the earth's magnetic field; and
an accelerometer to determine a gravitational direction.

4. The body-worn hearing assist device of claim 3, wherein the hearing assist device includes an algorithm to determine, based on analysis of data from the accelerometer, when a user is shaking or nodding his or her head.

5. The body-worn hearing assist device of claim 1, wherein the processor can receive a user supplied input for when the direction that the user is facing is generally aligned with the remote source position.

6. The body-worn hearing assist device of claim 1, wherein the directional sensor has an accuracy, wherein the switching occurs with an angular hysteresis associated with how far the direction the user is facing is away from the stored remote source positional reference, and wherein the angular hysteresis exceeds 2.5 times the accuracy of the directional sensor.

7. The body-worn hearing assist device of claim 1, comprising a mode switch controllable by the user for turning the algorithm for switching on or off.

8. The body-worn hearing assist device of claim 1, wherein a range of angles that the direction the user is facing can differ from the stored remote source positional reference while the output is primarily based on the second audio input signal is controllable by the user.

9. A system for switching a body-worn hearing assist device worn by a user between input audio signals, comprising:
a first directional sensor within a housing of the body-worn hearing assist device, the housing mating with the user's head anatomy;
an output outputting audio to the ear of the user; and
a second directional sensor associated with a first audio input signal position and transmitting its sensed value to the body-worn hearing assist device;
wherein the body-worn hearing assist device compares the value sensed by the first directional sensor with the transmitted value from the second directional sensor, and outputs audio based on a first audio input signal when the user is facing the first audio input signal position and outputs audio based on a second audio input signal when the user is facing away from the first audio input signal position.

10. The system of claim 9, wherein the second directional sensor is within a audio track streamer for a video shown on a screen, the audio track streamer wirelessly transmitting the first audio input signal to the body-worn hearing assist device.

11. The system of claim 10, wherein the audio track streamer comprises an arrow which the user points in the direction that the user will be located when viewing video on the screen, with the second directional sensor transmitting its sensed value in accordance with the direction the arrow is pointed.

12. A method of switching a body-worn hearing assist device worn by a user between input audio signals, the method comprising:
storing in memory a positional reference to a remote audio source position relative to a position of the user;
receiving realtime data from a head-worn directional sensor and using that realtime data to determine when a direction that the user is facing generally aligns with the stored remote source positional reference;
if the determination indicates that the direction that the user is facing generally aligns with the stored remote source positional reference, having the body-worn assist device output audio primarily based on a first audio input signal associated with the remote source, and if the determination indicates that the direction that the user is facing is not generally aligned with the stored remote source positional reference, switching to having the body-worn assist device output audio primarily based on a second audio input signal.

13. The method of claim 12, wherein the body-worn hearing assist device outputs audible sound directed by the body-worn hearing assist device into the ear of the user.

14. The method of claim 12, wherein the body-worn hearing assist device comprises a wireless receiver and a microphone, wherein the first audio input signal is received by the wireless receiver, and wherein the first audio input signal is received by the microphone based on sound waves.

15. The method of claim 12, further comprising:
pointing a pointer to the position the user will be in when the switching between input audio signals occurs, the pointer being physically connected to a second directional sensor which transmits information regarding the pointed direction to the body-worn hearing assist device, the pointed direction being used to store the remote source positional reference in memory in the body-worn hearing assist device.

16. The method of claim 12, wherein the first audio input signal is an audio track associated with a video displayed on a screen, the body-worn hearing assist device output being primarily based on the audio track when the user is generally facing the screen.

17. The method of claim 16, wherein the audio track is wirelessly transmitted by a streamer to be received in a wireless receiver in the body-worn hearing assist device, and wherein the streamer is separate from the screen such that the user can be generally facing the screen and not generally facing the streamer while the body-worn hearing assist device output is primarily based on the audio track associated with the video displayed on the screen.

18. The method of claim 12, wherein the first audio input signal is generated by a remote microphone.

19. The method of claim 12, wherein the body-worn hearing assist device is a hearing aid with a digital signal processor to modify audio to compensate for the hearing loss profile of the user, the hearing aid comprising a mode switch controllable by the user for turning the switching on or off.

20. The method of claim 19, wherein the hearing aid, when the mode switch is controlled to turn the switching on, runs through a calibration routine to identify and store the direction of the positional reference.

* * * * *